United States Patent
Kim

(10) Patent No.: US 12,388,274 B2
(45) Date of Patent: Aug. 12, 2025

(54) DEVICE AND METHOD FOR PREVENTING APPLICATION OF OVERCURRENT

(71) Applicant: LG ENERGY SOLUTION, LTD., Seoul (KR)

(72) Inventor: Do Yul Kim, Daejeon (KR)

(73) Assignee: LG ENERGY SOLUTION, LTD., Seoul (KR)

(*) Notice: Subject to any disclaimer, the term of this patent is extended or adjusted under 35 U.S.C. 154(b) by 654 days.

(21) Appl. No.: 17/608,689

(22) PCT Filed: Apr. 27, 2020

(86) PCT No.: PCT/KR2020/005534
§ 371 (c)(1),
(2) Date: Nov. 3, 2021

(87) PCT Pub. No.: WO2020/231042
PCT Pub. Date: Nov. 19, 2020

(65) Prior Publication Data
US 2022/0216715 A1 Jul. 7, 2022

(30) Foreign Application Priority Data
May 15, 2019 (KR) .................. 10-2019-0057089

(51) Int. Cl.
*H02J 7/00* (2006.01)
*H01M 10/44* (2006.01)
*H02J 7/34* (2006.01)

(52) U.S. Cl.
CPC ......... *H02J 7/00304* (2020.01); *H01M 10/44* (2013.01); *H02J 7/345* (2013.01)

(58) Field of Classification Search
CPC ....... H02J 7/00304; H02J 7/345; H01M 10/44
(Continued)

(56) References Cited

U.S. PATENT DOCUMENTS 6,737,756 B1 * 5/2004 Gale ...................... B60L 58/21
307/45
7,068,012 B1 * 6/2006 Geren ................ H01M 50/581
320/136
(Continued)

FOREIGN PATENT DOCUMENTS

| JP | 51-37419 A | 3/1976 |
| JP | 8-213055 A | 8/1996 |

(Continued)

OTHER PUBLICATIONS

Extended European search report issued on Jun. 10, 2022 for the corresponding European patent application 20804979.1.
(Continued)

*Primary Examiner* — Nathaniel R Pelton
(74) *Attorney, Agent, or Firm* — Birch, Stewart, Kolasch & Birch, LLP

(57) ABSTRACT

Disclosed is an overcurrent application prevention device including a current sensor for measuring a charging current applied from a charging unit to a battery, a bypass unit, a 3-terminal switch having a first end connected to charging unit and a second end that is switched to be connected to the battery or the bypass unit, a comparator for receiving the measured charging current and controlling the 3-terminal switch on the basis of a result of a comparison between the received charging current and a preset value.

11 Claims, 6 Drawing Sheets

(58) Field of Classification Search
USPC .......................................................... 320/162
See application file for complete search history.

(56) References Cited

U.S. PATENT DOCUMENTS

| | | | |
|---|---|---|---|
| 2003/0048006 A1 | | 3/2003 | Shelter, Jr. et al. |
| 2014/0062387 A1 | | 3/2014 | Kim |
| 2014/0145506 A1 | * | 5/2014 | Lu ...................... H02J 7/00304 |
| | | | 307/66 |
| 2015/0244315 A1 | * | 8/2015 | Mcnamara ........ H01L 31/02021 |
| | | | 136/244 |
| 2015/0346758 A1 | | 12/2015 | Sakakibara |
| 2016/0064979 A1 | | 3/2016 | Huang et al. |
| 2016/0094059 A1 | | 3/2016 | Maetani |
| 2018/0019590 A1 | | 1/2018 | Morimoto |
| 2018/0306845 A1 | * | 10/2018 | Yamaguchi ............ H02J 7/0047 |
| 2019/0229377 A1 | * | 7/2019 | Kim ........................ B60L 50/64 |
| 2019/0393696 A1 | | 12/2019 | Tada et al. |
| 2020/0185784 A1 | | 6/2020 | Yeom |
| 2020/0203961 A1 | * | 6/2020 | Flowers .............. H02J 7/00304 |

FOREIGN PATENT DOCUMENTS

| | | |
|---|---|---|
| JP | 8-272464 A | 10/1996 |
| JP | 10-66251 A | 3/1998 |
| JP | 2001-178009 A | 6/2001 |
| JP | 2008-149177 A | 6/2008 |
| JP | 2010-183679 A | 8/2010 |
| JP | 2012-143114 A | 7/2012 |
| JP | 2016-82800 A | 5/2016 |
| JP | 2017-135074 A | 8/2017 |
| JP | 2018-11482 A | 1/2018 |
| KR | 10-2004-0068714 A | 8/2004 |
| KR | 10-2005-0057693 A | 6/2005 |
| KR | 10-2014-0028531 A | 3/2014 |
| KR | 10-2015-0079747 A | 7/2015 |
| KR | 10-2016-0044239 A | 4/2016 |
| KR | 10-1740242 B1 | 5/2017 |
| KR | 10-2017-0135265 A | 12/2017 |
| KR | 10-2018-0017899 A | 2/2018 |
| KR | 10-2018-0028240 A | 3/2018 |
| KR | 10-1894970 B1 | 10/2018 |
| KR | 10-2018-0119320 A | 11/2018 |
| WO | WO 2006/112501 A1 | 10/2006 |
| WO | WO 2019/246414 A1 | 12/2019 |

OTHER PUBLICATIONS

International Search Report for PCT/KR2020/005534 (PCT/ISA/210) mailed on Jul. 30, 2020.

* cited by examiner

[FIG. 1]
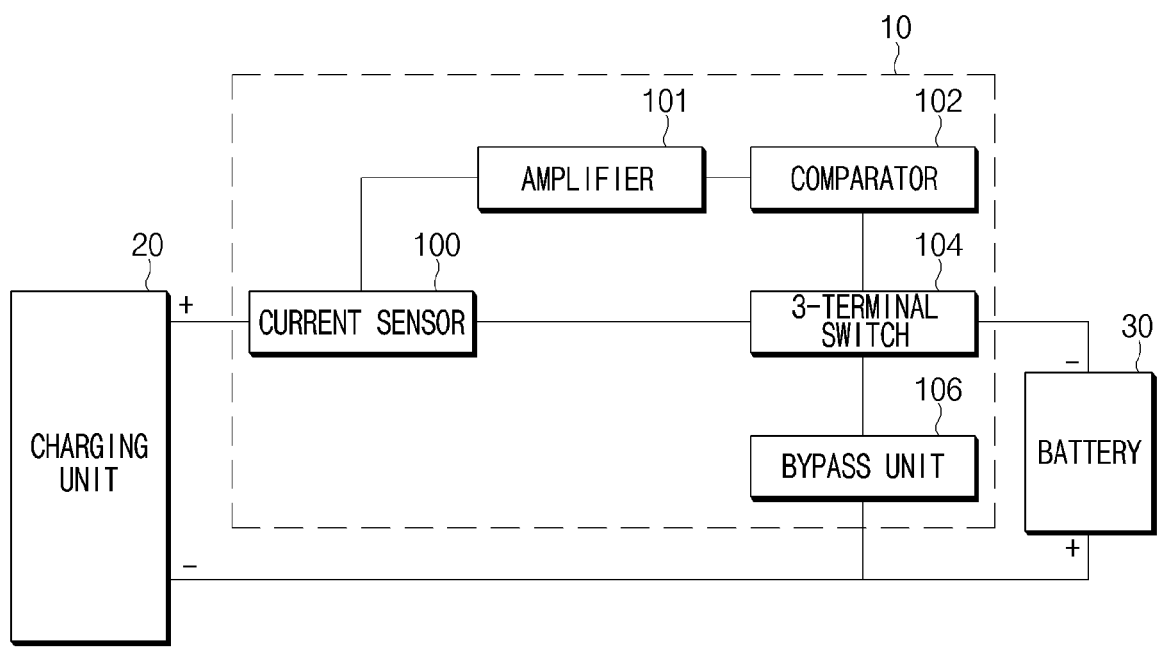

[FIG. 2]
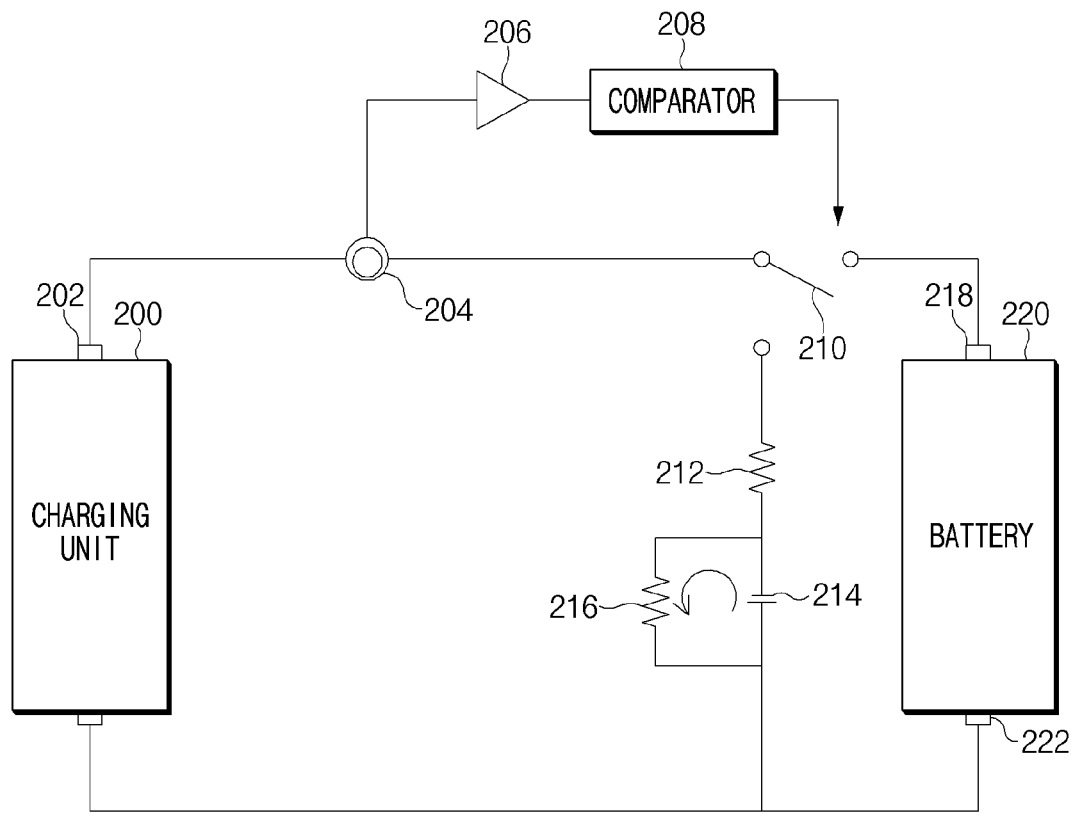

[FIG. 3]
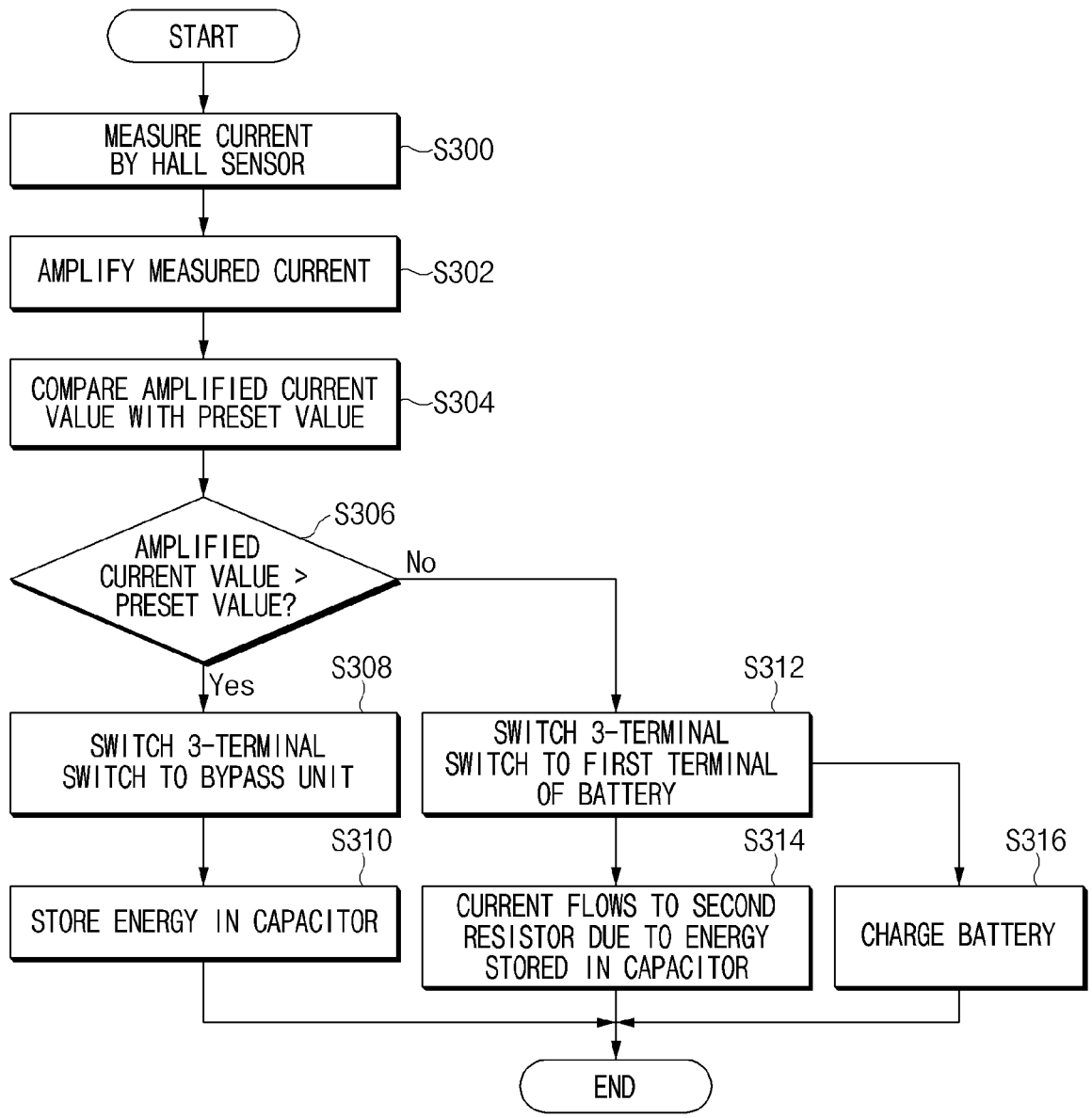

[FIG. 4]
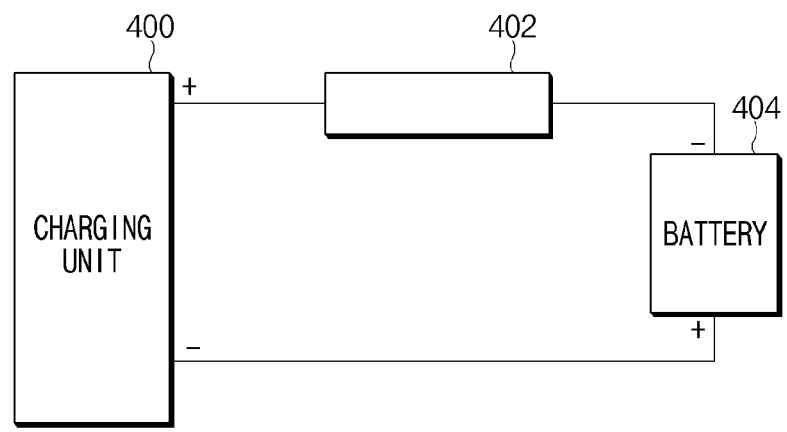
[FIG. 5]
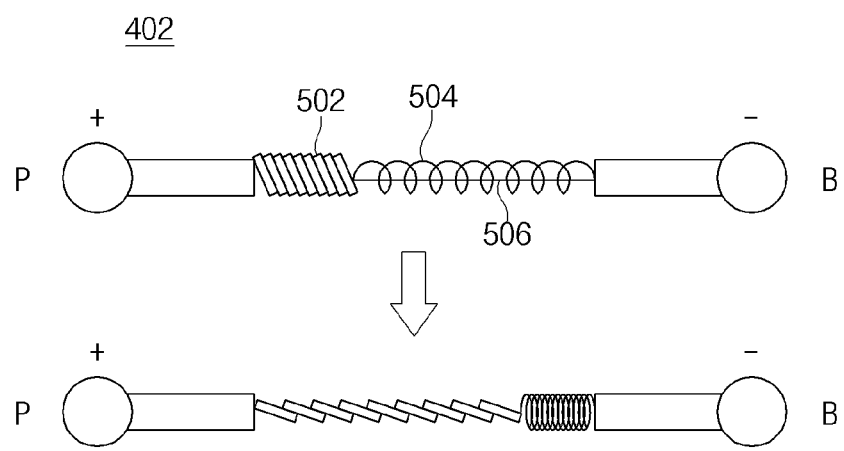

[FIG. 6]
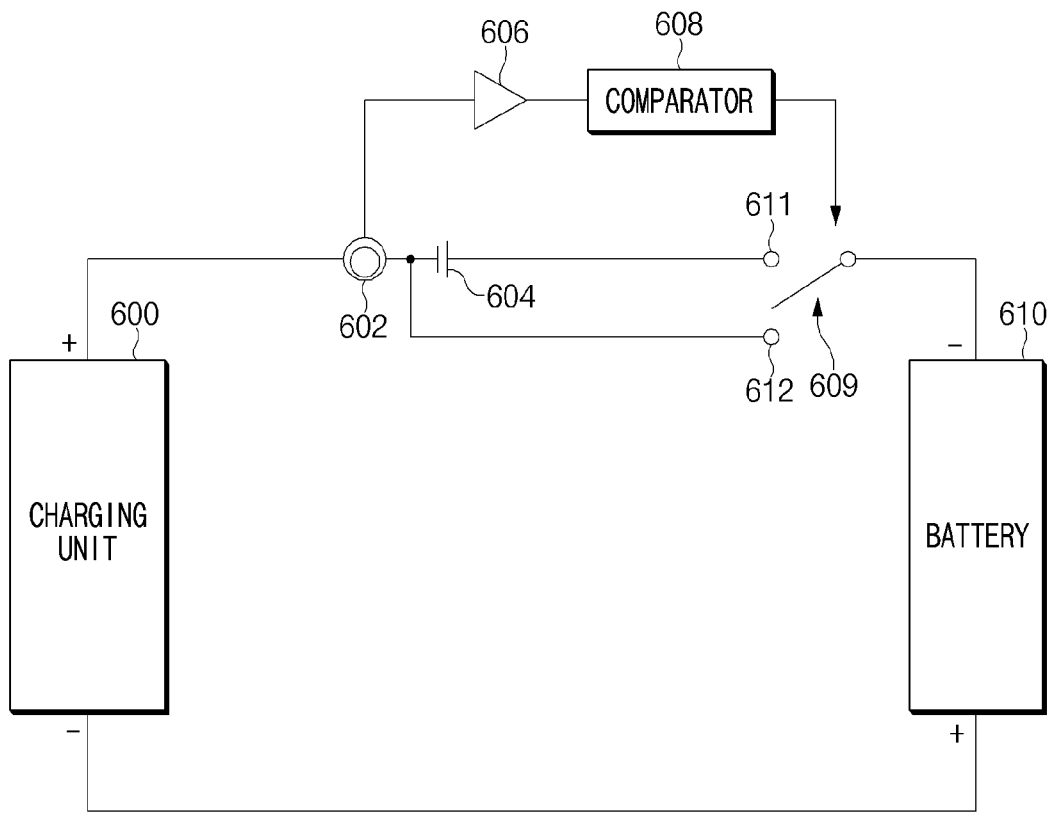

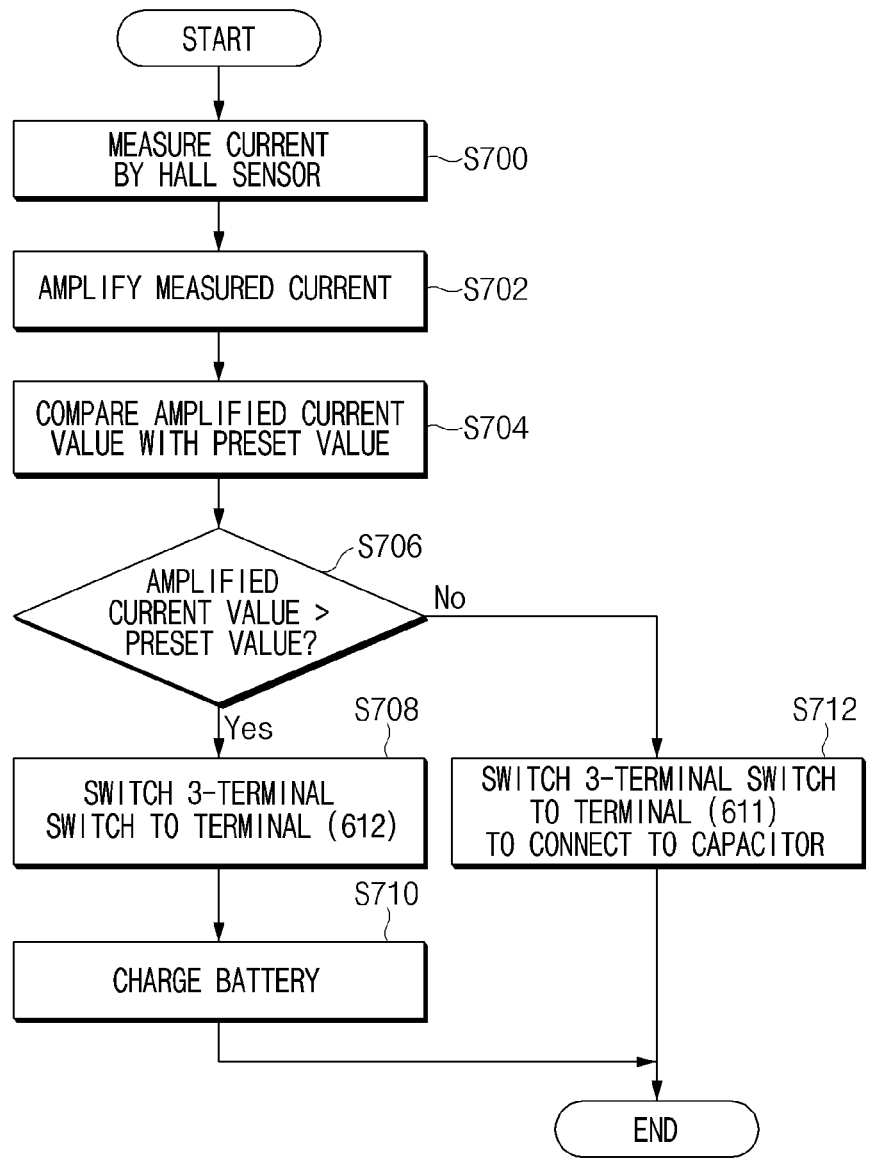

DEVICE AND METHOD FOR PREVENTING APPLICATION OF OVERCURRENT

CROSS-REFERENCE TO RELATED APPLICATIONS

This application claims the benefit of Korean Patent Application No. 10-2019-0057089, filed on May 15, 2019, in the Korean Intellectual Property Office, the disclosure of which is incorporated herein in its entirety by reference.

TECHNICAL FIELD

The present invention relates to a device and method for preventing application of overcurrent.

BACKGROUND ART

Recently, research and development of secondary batteries has been actively carried out. Here, the secondary batteries, which are rechargeable batteries, represent both conventional Ni/Cd batteries and Ni/MH batteries and up-to-date lithium ion batteries. The lithium ion batteries among the secondary batteries have the merit of high energy density compared to the conventional Ni/Cd batteries or Ni/MH batteries. Furthermore, the lithium ion batteries can be made small in size and light in weight, and are thus used as power sources of mobile devices. Moreover, since the scope of use of the lithium ion batteries extend to power sources of electric vehicles, the lithium ion batteries attract attention as next-generation energy storage media.

A secondary battery is typically used as a battery rack including a battery module in which a plurality of battery cells are connected in series and/or in parallel. The state and operation of the battery rack are managed and controlled by a battery management system.

A plurality of battery modules are connected in series or in parallel to constitute a battery rack, and a plurality of battery racks are connected in parallel to constitute a battery bank. Such a battery bank may be used as an energy storage system (ESS).

Regarding ESSs that are used in underdeveloped countries, application of overcurrent to ESS packs frequently occurs according to a charging environment, causing a short circuit of an ESS pack fuse or continuous occurrence of an alarm. Thus, it is often difficult to operate ESSs normally.

A normal charger charges an ESS by applying a current limited by a voltage suitable for an ESS pack. However, an abnormal charger causes a phenomenon in which overcurrent is applied from the charger to an ESS at the moment when the ESS is connected to the charger.

Although this is a problem of a charger, ESS packs which can be operated normally in such an environment are required.

DETAILED DESCRIPTION OF THE INVENTION

Technical Problem

An object of the present invention is to provide an overcurrent application prevention device and method for making it possible to safely charge a battery without being affected by instantaneous overcurrent even when an abnormal charger is connected.

Technical Solution

An overcurrent application prevention device according to an embodiment is characterized by including a current sensor configured to measure a charging current applied from a charging unit to a battery; a bypass unit; a 3-terminal switch having a first end connected to charging unit and a second end that is switched to be connected to the battery or the bypass unit; a comparator configured to: receive the charging current from the current sensor and control the 3-terminal switch to be connected to the battery or to the bypass unit on the basis of a result of a comparison between the received charging current and a preset value.

The overcurrent application prevention device according to an embodiment is characterized in that the current sensor is a Hall sensor.

The overcurrent application prevention device according to an embodiment is characterized in that the 3-terminal switch is switched to be connected to the battery when the measured current value is smaller than the preset value, and is switched to be connected to the bypass unit when the measured current value is greater than the preset value.

The overcurrent application prevention device according to an embodiment is characterized in that the bypass unit includes a first resistor having a first terminal connected to the 3-terminal switch, a capacitor connected to a second terminal of the first resistor, and a second resistor connected in parallel to the capacitor.

The overcurrent application prevention device according to an embodiment is characterized in that when the 3-terminal switch is switched to be connected to the bypass unit by being controlled by the comparator, the charging current applied from the charging unit flows to the capacitor so that energy is stored in the capacitor.

The overcurrent application prevention device according to an embodiment is characterized in that when the 3-terminal switch is switched to be connected to the battery by being controlled by the comparator, the current flows to the second resistor due to the energy stored in the capacitor.

The overcurrent application prevention device according to an embodiment is characterized in that the bypass unit includes a first resistor having a first terminal connected to the 3-terminal switch, a battery cell connected to a second terminal of the first resistor, and a second resistor connected in parallel to the battery cell.

The overcurrent application prevention device according to an embodiment is characterized in that when the 3-terminal switch is switched to be connected to the bypass unit by being controlled by the comparator, the charging current applied from the charging unit flows to the battery cell so that energy is stored in the battery cell.

The overcurrent application prevention device according to an embodiment is characterized in that when the 3-terminal switch is switched to be connected to the battery by being controlled by the comparator, the current flows to the second resistor due to the energy stored in the battery cell.

An overcurrent application prevention method according to an embodiment of the present invention is characterized by including the steps of: measuring a charging current applied from a charging unit to a battery; amplifying a value of the measured current; comparing the amplified value with a preset value; and controlling a 3-terminal switch so that the charging current is bypassed when the amplified value is greater than the preset value, and controlling the 3-terminal switch so that the charging current flows to the battery when the amplified value is smaller than the preset value.

The overcurrent application prevention method according to an embodiment of the present invention is characterized in that the step of measuring the current is performed by a Hall sensor.

The overcurrent application prevention method according to an embodiment of the present invention is characterized in that when the 3-terminal switch is controlled so that the charging current applied from the charging unit is bypassed, the current flows to a capacitor so that energy is stored in the capacitor.

The overcurrent application prevention method according to an embodiment of the present invention is characterized in that when the 3-terminal switch is controlled so that the charging current applied from the charging unit flows to the battery, the battery is charged, and the current flows to a resistor connected in parallel to the capacitor due to the energy stored in the capacitor.

The overcurrent application prevention method according to an embodiment of the present invention is characterized in that when the 3-terminal switch is controlled so that the charging current applied from the charging unit is bypassed, the current flows to a battery cell so that energy is stored in the battery cell.

The overcurrent application prevention method according to an embodiment of the present invention is characterized in that when the 3-terminal switch is controlled so that the charging current applied from the charging unit flows to the battery, the battery is charged, and the current flows to a resistor connected in parallel to the battery cell due to the energy stored in the battery call.

Effects of the Invention

The present invention has the effect of safely charging a battery without being affected by instantaneous overcurrent even when an abnormal charger is connected.

BRIEF DESCRIPTION OF THE DRAWINGS

FIG. 1 is a configuration diagram illustrating an overcurrent application prevention device according to an embodiment of the present invention.

FIG. 2 is a diagram illustrating an implementation example of an overcurrent application prevention device according to an embodiment of the present invention.

FIG. 3 is a flowchart illustrating an overcurrent application prevention method according to an embodiment of the present invention.

FIG. 4 is a diagram illustrating an installation example of an overcurrent application prevention device according to another embodiment of the present invention.

FIG. 5 is a configuration diagram illustrating an overcurrent application prevention device according to another embodiment of the present invention.

FIG. 6 is a configuration diagram illustrating an overcurrent application prevention device according to another embodiment of the present invention.

FIG. 7 is a flowchart illustrating an overcurrent application prevention method according to another embodiment of the present invention.

MODE FOR CARRYING OUT THE INVENTION

Hereinafter, various embodiments of the present invention will be described in detail with reference to the accompanying drawings. However, it should be understood that the present invention is not limited to specific embodiments, but rather includes various modifications, equivalents and/or alternatives of various embodiments of the present invention. Regarding description of the drawings, like reference numerals may refer to like elements.

The terminology used herein is only used for describing specific embodiments and is not intended to limit the scope of other embodiments. The terms of a singular form may include plural forms unless otherwise specified. The terms used herein, including technical or scientific terms, have the same meanings as understood by those skilled in the art. Commonly-used terms defined in a dictionary may be interpreted as having meanings that are the same as or similar to contextual meanings defined in the related art, and should not be interpreted in an idealized or overly formal sense unless otherwise defined explicitly. Depending on cases, even the terms defined herein should not be such interpreted as to exclude various embodiments of the present invention.

The terms "first", "second", "A", "B", "(a)", "(b)" and the like may be used herein to describe elements of the embodiments of the present invention. However, the terms are only used to distinguish one element from other elements, and the attributes or order of the elements are not limited by the terms. It will be understood that when an element is referred to as being "connected" or "coupled" to another element, it can be directly connected or coupled to the other element, or other intervening elements may "connected" or "coupled" therebetween.

FIG. 1 is a configuration diagram illustrating an overcurrent application prevention device according to an embodiment of the present invention.

According to the prior art, a negative temperature coefficient (NTC) thermistor is connected to a charging path to consume energy by increasing a resistance value when overcurrent flows, thereby preventing abnormal overcurrent from being applied to an ESS. This configuration makes it possible to efficiently consume energy in an overcurrent situation, but causes a voltage drop and heat generation due to a resistance value of an NTC itself even in a normal operation state. In order to supplement this conventional configuration, the overcurrent application prevention device of the present invention monitors through a Hall sensor to bypass a current having at least a reference value when the current having at least the reference value is applied, so as to block overcurrent from being directly applied to an ESS pack.

In detail, an overcurrent application prevention device 10 of the present invention includes a current sensor 100, an amplifier 101, a comparator 102, a 3-terminal switch 104, and a bypass unit 106.

The current sensor 100 measures a current flowing between one terminal of a charging unit 20 and the 3-terminal switch 104.

A current value measured by the current sensor 100 is transferred to the amplifier 101. The amplifier 101 that has received the measured current value from the current sensor 100 amplifies the measured current value.

The amplifier 101 transfers the amplified current value to the comparator 102. Here, the amplifier 101 may be omitted, and the measured current value may be directly transferred to the comparator 102.

The comparator 102 receives the amplified current value from the amplifier and compares the amplified current value with a preset value. The comparator 102 may compare the amplified current value with the preset value to control the 3-terminal switch 104 to contact the bypass unit 106 when the amplified current value is greater than the preset value, and may compare the amplified current value with the preset value to control the 3-terminal switch 104 to contact one terminal side of a battery 30 when the amplified current value is smaller than the preset value.

One end of the 3-terminal switch 104 is electrically connected to the charging unit 20, and another end is connected to one end of the battery 30 or one end of the bypass unit 106 according to a result value from the comparator 102.

As described above, the 3-terminal switch 104 is connected to the side of the bypass unit 106 when the current value (or amplified value) measured by the current sensor is greater than the preset value, and is connected to the side of the battery 30 when the current value (or amplified value) measured by the current sensor is smaller than the preset value.

When the 3-terminal switch 104 is connected to the side of the bypass unit 106, a current applied from the charging unit 20 flows to the bypass unit 106 and is thus not applied to the battery 30, thereby protecting the battery 30 from overcurrent.

When the 3-terminal switch 104 is connected to the side of the battery 30, the current applied from the charging unit 20 is applied to the battery 30, and thus the battery 30 is charged safely.

FIG. 2 is a diagram illustrating an implementation example of an overcurrent application prevention device according to an embodiment of the present invention.

The overcurrent application prevention device 10 includes a current sensor 204, an amplifier 206, a comparator 208, a 3-terminal switch 210, a first resistor 212, a capacitor 214, and a second resistor 216.

The current sensor 204 measures a current flowing between a first terminal 202 of a charging unit 200 and the 3-terminal switch 210. The current sensor 204 may be a Hall sensor, which does not consume a current output from the charging unit 200 or does not cause a voltage drop due to resistance. A value of the current output from the charging unit 200 is measured by the Hall sensor 204.

The current value measured by the Hall sensor 204 is transferred to the amplifier 206. The amplifier 206 that has received the measured current value from the Hall sensor 204 amplifies the current value. Here, the amplifier 206 may be omitted, and the measured current value may be directly transferred to the comparator 208.

The comparator 208 receives the amplified current value from the amplifier and compares the amplified current value with a preset value. The comparator 208 may compare the amplified current value with the preset value to control the 3-terminal switch 210 to contact the first resistor 212 when the amplified current value is greater than the preset value, and may compare the amplified current value with the preset value to control the 3-terminal switch 210 to contact one terminal side 218 of a battery 220 when the amplified current value is smaller than the preset value.

One end of the 3-terminal switch 210 is connected to the first terminal 202 of the charging unit 200, and another end is connected to the first terminal 218 of the battery 220 or the first resistor 212 according to a result value from the comparator 208. Further, the charging unit 200 is also connected to a second terminal 222 of the battery and to the capacitor 214.

As described above, the 3-terminal switch 210 is connected to the side of the first resistor 212 when the current value (or amplified value) measured by the current sensor is greater than the preset value, and is connected to the side of the first terminal 218 of the battery 220 when the current value (or amplified value) measured by the current sensor is smaller than the preset value.

When the 3-terminal switch 210 is connected to the first resistor 212, the current applied from the charging unit 200 is applied to the first resistor 212 and dropped to a voltage suitable for a battery module for bypass, and energy is stored in the capacitor 214. Further, the capacitor 214 may be replaced with a battery cell 214.

When the 3-terminal switch 210 is connected to the side of the first terminal 218 of the battery 220, the current applied from the charging unit 200 is applied to the battery 220, and thus the battery 220 is charged safely. Furthermore, when the 3-terminal switch 210 is connected to the first terminal 218 of the battery 220 or is not connected to the first resistor 212, energy stored in the capacitor 214 is discharged by the second resistor 216.

Since the energy stored in the capacitor 214 is discharged as described above, when overcurrent is applied from the charging unit 200 thereafter, the current is applied and thus energy may be stored. That is, the capacitor 214 stores energy when overcurrent is applied, and discharges energy while overcurrent is not applied. Although the above descriptions are given using the capacitor as an example, a battery cell or a battery module rather than the capacitor may be used as the same corresponding configuration. The battery module or the battery cell may be replaced with a configuration having the same function as the capacitor in an embodiment of the present invention or another embodiment.

FIG. 3 is a flowchart illustrating an overcurrent application prevention method according to an embodiment of the present invention.

A current applied from the charging unit 200 is measured by the Hall sensor 204 (S300). The hall sensor 204 may measure a current without consuming a current output from the charging unit 200 or causing a voltage drop due to resistance.

The current value measured by the Hall sensor 204 is transferred to the amplifier 206. The amplifier 206 that has received the measured current value from the Hall sensor 204 amplifies the current value (S302). Here, the amplifier 206 may be omitted, and the measured current value may be directly transferred to the comparator 208.

The comparator 208 receives the amplified current value from the amplifier and compares the amplified current value with a preset value (S304). The comparator 208 may compare the amplified current value with the preset value to control the 3-terminal switch 210 to contact the first resistor 212 when the amplified current value is greater than the preset value, and may compare the amplified current value with the preset value to control the 3-terminal switch 210 to contact one terminal side of the battery 220 when the amplified current value is smaller than the preset value.

The comparator 208 compares the amplified current value with the preset value to determine whether the amplified current value is greater than the preset value (S306). When the amplified current value is greater than the preset value, the comparator 208 controls the 3-terminal switch 210 to contact the first resistor 212. That is, the comparator 208 switches the 3-terminal switch to a bypass unit (S308).

When the 3-terminal switch 210 is connected to the first resistor 212, the current applied from the charging unit 200 is applied to the first resistor 212 and dropped to a voltage suitable for a battery module for bypass, and energy is stored in the capacitor 214 (S310).

When the amplified current value is smaller than the preset value, the 3-terminal switch 210 is connected to the side of the first terminal 218 of the battery 220 (S312). When the 3-terminal switch 210 is connected to the side of the first terminal 218 of the battery 220, the current applied from the charging unit 200 is applied to the battery 220, and thus the battery 220 is charged safely (S316).

Furthermore, when the 3-terminal switch 210 is connected to the first terminal 218 of the battery 220 or is not connected to the first resistor 212, energy stored in the capacitor 214 is discharged by the second resistor 216 (S314).

FIG. 4 is a diagram illustrating an installation example of an overcurrent application prevention device according to another embodiment of the present invention.

An overcurrent application prevention device 402 is installed between a charging unit 400 and a battery 404. A connected spring center axis of the overcurrent application prevention device 402 is configured with a fuse and is cut when a current increases, and thus the spring is compressed and a contact surface of a current transfer part increases, thus increasing resistance.

Detailed descriptions will be given with reference to FIG. 5.

FIG. 5 is a configuration diagram illustrating the overcurrent application prevention device 402 according to another embodiment of the present invention.

The overcurrent application prevention device 402 includes a current transfer part 502, through which a current flows and which includes a plurality of metal (conductor) rods connected in a rail form so as to have a length that reduces or extends, a spring part 504 connected to the current transfer part, and a fuse part 506, which supports the spring part 504 in an extended state. When a transferred current has at least a fixed reference value, the overcurrent application prevention device 402 generates heat, and thus the fuse part 506 is cut. When the fuse part 506 is cut, a support portion in which the fuse part supports between one ends of the spring part 504 disappears, and thus the spring part 504 restores to a compressed state, thus extending the current transfer part 502.

Any conductor that allows a flow of current may be used as the current transfer part 502. Since a plurality of conductor rods are connected to each other by rail or the like in the current transfer part 502, the current transfer part 502 is capable of performing a motion of reducing and extending the length thereof. When an applied current has at least a fixed value, the overcurrent application prevention device 402 generates heat, and thus the fuse part 506 that supports the spring part 504 is cut. When the fuse part 506 is cut, the spring part 504 that was supported by the fuse part 506 restores to a compressed state, thus extending the current transfer part 502. Since the current transfer part 502 is extended, the contact surface increases, thus increasing resistance. When the resistance of the current transfer part 502 increases, a current applied from a charging unit is transferred to a battery after consuming energy while passing through the current transfer part 502, and thus the battery may be prevented from being damaged by overcurrent.

FIG. 6 is a configuration diagram illustrating an overcurrent application prevention device according to another embodiment of the present invention.

The overcurrent application prevention device includes a current sensor 602, a capacitor 604, an amplifier 606, and a comparator 608.

The current sensor 602 may be a Hall sensor, which does not consume a current output from a charging unit 600 or does not cause a voltage drop due to resistance.

The current sensor 602 measures a current which is output from the charging unit 600 and flows to the side of a battery 610. The current value measured by the current sensor 602 is transferred to the amplifier 606. The amplifier 606 that has received the measured current value from the current sensor 602 amplifies the measured current value.

Here, the amplifier 606 may be omitted, and the measured current value may be directly transferred to the comparator 608.

The comparator 608 receives the amplified current value from the amplifier and compares the amplified current value with a preset value. The comparator 608 compares the amplified current value with the preset value to control a 3-terminal switch 609 to connect to a terminal 611 so as to connect the battery 610 and the capacitor 604 when the amplified current value is greater than the preset value, and compares the amplified current value with the preset value to control the 3-terminal switch 609 to connect to a terminal 612 so as to safely charge the battery 610 when the amplified current value is smaller than the preset value.

FIG. 7 is a flowchart illustrating an overcurrent application prevention method according to another embodiment of the present invention.

A current applied from the charging unit 600 is measured by the Hall sensor 602 (S700). The hall sensor 602 may measure a current without consuming a current output from the charging unit 600 or causing a voltage drop due to resistance.

The current value measured by the Hall sensor 602 is transferred to the amplifier 606. The amplifier 606 that has received the measured current value from the Hall sensor 602 amplifies the current value (S702). Here, the amplifier 606 may be omitted, and the measured current value may be directly transferred to the comparator 608.

The comparator 608 receives the amplified current value from the amplifier 606 and compares the amplified current value with a preset value (S704). Here, the amplifier 606 may be omitted, and the measured current value may be directly transferred to the comparator 608.

The comparator 608 determines whether the amplified current value from the amplifier 606 is greater than the preset value (S706). The comparator 608 controls the 3-terminal switch 609 to contact the terminal 611 when the amplified current value is greater than the preset value (S712), and controls the 3-terminal switch 609 to contact the terminal 612 when the amplified current value is smaller than the preset value (S708).

When the 3-terminal switch 609 is connected to the terminal 612, a current is applied from the charging unit 600 to charge the battery 610 (S710).

In the present disclosure, the term "an embodiment" or various modified expressions thereof indicate that specific features, structures, and characteristics related to this embodiment are included in at least one embodiment of the principle of the present invention. Therefore, the term "in an embodiment" and various modified expressions thereof should not be construed as indicating the same embodiment.

All of the embodiments and conditional examples disclosed herein are intended to assist those skilled in the art with understanding the principle and concept of the present invention, and, thus, those skilled in the art could understand that the present invention can be implemented in modified forms without departing from the essential characteristics of the present invention. Therefore, the embodiments disclosed herein should be considered to be not limitative but illustrative. The scope of the present invention should be defined not by the above description but by the claims, and all differences that fall within the same scope as the claims should be construed as being covered by the present invention.

The invention claimed is:

1. An overcurrent application prevention device, comprising:
 a current sensor configured to measure a current applied from a charging unit to a battery;
 a bypass unit;
 a 3-terminal switch having a first end connected to the charging unit and a second end that is switched to be connected to the battery or the bypass unit; and
 a comparator configured to:
  receive the current from the current sensor, and
  control the 3-terminal switch to be connected to the battery or to the bypass unit based on a result of a comparison between the current and a preset value,
 wherein the bypass unit comprises:
  a first resistor having a first terminal connected to the 3-terminal switch;
  a capacitor connected to a second terminal of the first resistor; and
  a second resistor connected in parallel to the capacitor,
 wherein the capacitor stores energy when the current is greater than the preset value, and the energy stored in the capacitor is discharged when the current is smaller than the preset value, and
 wherein, when the 3-terminal switch is connected to the battery, the energy stored in the capacitor is discharged by the second resistor.

2. The overcurrent application prevention device of claim 1, wherein the current sensor is a Hall sensor.

3. The overcurrent application prevention device of claim 1, wherein the 3-terminal switch is switched to be connected to the battery when the current is smaller than the preset value, and is switched to be connected to the bypass unit when the current is greater than the preset value.

4. The overcurrent application prevention device of claim 1, wherein, when the 3-terminal switch is switched to be connected to the bypass unit by being controlled by the comparator, the current applied from the charging unit flows to the capacitor so that energy is stored in the capacitor.

5. The overcurrent application prevention device of claim 4, wherein, when the 3-terminal switch is switched to be connected to the battery by being controlled by the comparator, the current flows to the second resistor due to the energy stored in the capacitor.

6. The overcurrent application prevention device of claim 1, wherein the first resistor is connected in series with a circuit including the capacitor and the second resistor.

7. An overcurrent application prevention method comprising:
 measuring a current applied from a charging unit to a battery;
 amplifying a value of the current;
 comparing the amplified value with a preset value;
 controlling a 3-terminal switch so that the current is bypassed through a bypass unit when the amplified value is greater than the preset value; and
 controlling the 3-terminal switch so that the current flows to the battery when the amplified value is smaller than the preset value,
 wherein the bypass unit comprises:
  a first resistor having a first terminal connected to the 3-terminal switch,
  a capacitor connected to a second terminal of the first resistor, and
  a second resistor connected in parallel to the capacitor,
 wherein the capacitor stores energy when the current is greater than the preset value, and the energy stored in the capacitor is discharged when the current is smaller than the preset value, and
 wherein, when the 3-terminal switch is connected to the battery, the energy stored in the capacitor is discharged by the second resistor.

8. The overcurrent application prevention method of claim 7, wherein the measuring the current is performed by a current sensor, and
 wherein the current sensor is a Hall sensor.

9. The overcurrent application prevention method of claim 7, wherein, when the 3-terminal switch is controlled so that the current applied from the charging unit is bypassed, the current flows to the capacitor so that the energy is stored in the capacitor.

10. The overcurrent application prevention method of claim 9, wherein, when the 3-terminal switch is controlled so that the current applied from the charging unit flows to the battery, the battery is charged, and the current flows to the second resistor connected in parallel to the capacitor due to the energy stored in the capacitor.

11. The overcurrent application prevention method of claim 7, wherein, when the 3-terminal switch is controlled so that the current applied from the charging unit flows to the battery, the battery is charged, and the current flows to the second resistor connected in parallel to the capacitor due to the energy stored in the capacitor.

* * * * *